United States Patent [19]

Kruka

[11] Patent Number: 4,646,837
[45] Date of Patent: Mar. 3, 1987

[54] PROCESS FOR REMOVAL OF WAX DEPOSITS

[75] Inventor: Vitold R. Kruka, Houston, Tex.

[73] Assignee: Shell Oil Company, Houston, Tex.

[21] Appl. No.: 779,719

[22] Filed: Sep. 24, 1985

[51] Int. Cl.$^4$ ............................................. E21B 37/06
[52] U.S. Cl. .................... 166/304; 134/22.12; 134/22.14; 252/8.552
[58] Field of Search .................. 252/8.55 B; 166/304, 166/312; 134/22.12, 22.14, 40

[56] References Cited

U.S. PATENT DOCUMENTS

| | | |
|---|---|---|
| 2,139,595 | 12/1938 | Lerch et al. |
| 2,356,205 | 8/1944 | Blair et al. |
| 2,356,254 | 8/1944 | Lehmann et al. ................... 252/8.55 |
| 2,470,831 | 5/1949 | Monson ............................. 252/8.55 |
| 2,580,765 | 1/1952 | Hall et al. ........................... 252/8.55 |
| 2,981,684 | 4/1961 | Barnes et al. ...................... 252/8.55 |
| 3,241,614 | 3/1966 | Bertness . |
| 3,342,265 | 9/1967 | Willard et al. ..................... 252/8.55 |
| 3,718,586 | 2/1973 | Rollo et al. ........................ 252/8.55 |
| 3,794,523 | 2/1974 | Thompson ..................... 252/8.55 X |
| 4,089,703 | 5/1978 | White .................................. 134/22 |
| 4,174,271 | 11/1979 | Mayes ................................ 208/64 |
| 4,207,193 | 6/1980 | Ford et al. . |
| 4,301,868 | 11/1981 | Scherubel et al. ................. 252/8.55 |
| 4,442,014 | 4/1984 | Looney et al. ..................... 252/8.55 |
| 4,455,175 | 6/1984 | Settineri et al. ............... 252/8.55 X |
| 4,474,622 | 10/1984 | Forster ................................ 134/10 |
| 4,543,131 | 9/1985 | Purinton ............................ 252/8.55 |

Primary Examiner—Herbert B. Guynn

[57] ABSTRACT

Solid wax-containing material deposited on pipeline walls, well tubing, etc., are removed by contacting the deposited wax with a mixture of a dispersant-type surfactant and light hydrocarbon at ambient temperatures.

6 Claims, No Drawings

PROCESS FOR REMOVAL OF WAX DEPOSITS

BACKGROUND OF THE INVENTION

This invention relates to dispersing and removing solid wax-containing material from surfaces. More particularly, the invention relates to a process for removing solid wax-containing material from surfaces such as pipeline walls, well tubing flowlines, storage vessels, and similar equipment.

Petroleum fluids produced from wells frequently contain wax which deposits in the wellbore and in equipment utilized for producing and transporting the petroleum fluids. Also, the wax tends to accumulate in pipelines, storage vessels, and other equipment wherein the petroleum fluids are processed. This is a serious problem in that the deposition of wax interferes with the production, transportation, storage, and processing of the petroleum fluids containing such wax. Wax deposition may proceed to the point where production is completely interrupted or flowline flow is stopped. The problem of removing wax deposits from pumping wells and flowlines has been attacked in a number of ways. Perhaps the most effective and oldest method heretofore, was to clean the well or flowline mechanically, e.g., by scraping, which resulted in lost production time and high labor costs and required special tools, all of which was often too expensive to be economically feasible.

Another common practice to try to restore the flow of a well or flowline is by cleaning the well or flowline with chemical solvents. Hot oil or solvent has been introduced in the well or flowline in an effort to dissolve the wax. However, the solvents used in the prior art, have been effective only to dissolve the wax and other hydrocarbons that are readily soluble in organic media. Also, the use of such solvents has been a time consuming and costly operation and has resulted in considerable loss of production time. Thus, the prior art method of cleaning wells by the use of solvents, has been largely ineffective and in many instances has served only to worsen the fouling of the flowlines or well by redeposition as the hot solvent cooled.

Another technique to remove wax deposits from wells and flowlines resides in utilizing an acid-base reaction to generate heat in situ in order to dissolve the deposited wax. Such cleaning operations however, have been less than satisfactory for one reason or another. Thus, it has been difficult to control the heat of reaction necessary to provide the desired high temperature needed for efficient wax removal, without redeposition of the wax and/or damage to the equipment.

Applicant is not aware of any prior art which, in his judgment as one skilled in the pipeline art, would anticipate or render obvious the novel method of the present invention; however, for the purposes of fully developing the background of the invention and establishing the state of the requisite art, the following is set forth: U.S. Pat. Nos. 4,089,703; 4,174,271; 4,442,014.

SUMMARY OF THE INVENTION

A primary purpose of the present invention is to provide a process for cleaning pipeline walls, oil well tubulars, etc., which is relatively simple and easy to practice with uniformly desirable results.

Yet another purpose of the invention is to provide a process for cleaning pipelines walls, well tubing etc., which is characterized in that redeposition of the wax is substantially prevented.

An additional purpose of the invention is to provide an efficient wax cleaning operation for pipeline walls, well tubing, etc., characterized by its ease of control and operation modulation.

These and other purposes are obtained by contacting a wax-containing material on a surface such as a pipeline wall or well tubing with a dispersant type surfactant and a light hydrocarbon. The preferred light hydrocarbon is an aromatic light reformate and the preferred surfactant is a dispersant type cationic surfactant. A high velocity stream is utilized to flush the free, solid wax particles. Flushing can be conducted with conventional crude oil. Preferably, flushing is followed by a sweep of the pipeline, etc., with either a soft foam swab, gel, or a tight emulsion for further pickup of wax particles.

Other purposes, distinctions over the art, advantages and features of the invention will be apparent to one skilled in the art upon review of the following.

DESCRIPTION OF PREFERRED EMBODIMENTS

In accordance with the present invention, the removal of normally solid, wax-containing material which has been deposited onto the surfaces of oil wells, flowlines, transmission lines, or other pipelines, storage tanks and the like, is accomplished by contacting the wax-containing material with a mixture of a dispersant type surfactant and light hydrocarbon, suitably at ambient temperatures. The present invention offers an alternative means of removing thick deposits from pipelines or well tubing. While deposits can be controlled and removed by mechanical scraping by pipeline pigs or scrapers in the case of pipelines or wireline units in the case of wells, usually scrapers are only effective when the deposits are relatively thin. Scraping of thick deposits can lead to a large quantity of wax in front of the scraper whose movement may require pressures in excess of the line pressure limits, resulting in a plugged line. Thick deposits can, and have been, removed by heat by pumping a hot solvent into the line or well which dissolves the deposit. The solvent may be treated with dispersants and/or wax crystal modifiers which will preclude the wax solvent mixture from gelling on cooling. Such a procedure is suitable for relatively short lines, especially in the case of offshore lines. Easy access to subsea lines can only be obtained at the end of the lines. Subsea lines lose heat rapidly. Very hot (greater than 150° F.) fluids cannot be pumped into the line as high temperatures will damage the pipeline external corrosion coating. Thus, the present invention offers an alternate means of removing thick deposits from pipelines or well tubulars which does not involve the risk of plugging inherent in scraping, and does not require heat.

A description of the wax deposits is essential to understanding the present invention. The deposits are not pure wax but contain oil, normally in the 30–50% volume range. That is, the deposits are porous. Further, the deposits can be drained of most of the oil, implying that the deposits are permeable. This indicates that the interstitial oil can be replaced by other fluids. A series of tests on wax deposits exposed to light hydrocarbons mixed with dispersant type surfactants showed that the light hydrocarbon and surfactant penetrated deposits, displaced a more viscous oil and broke up the deposits into small fragments which could be displaced from the pipeline in the form of a slurry of wax particles in the light hydrocarbon. A field test, conducted at ambient temperatures, in a 6400-foot, 5-inch, subsea line in the Gulf of Mexico provided the results as shown in Table 1.

TABLE 1

| Status | Maximum Flow Rate (bph) | Flow Pressure Drop (psi) |
| --- | --- | --- |
| Initial | 60 | 115 |
| After cleaning | 135 | 65 |

Conventional flow analysis of the above data indicates that the cleaning resulted in a 52% increase in the effective line diameter. Inspection of the cleaning solution discharged from the line after cleaning showed presence of suspended wax particles up to 3/16ths-inch in size. The cleaning solution was suitable for injection into subsequent pipelines.

Various other ingredients may also be used in the cleaning solution in order to promote the cleaning action of the process of the present invention. These other ingredients can comprise, for instance, other surfactants, stabilizers, descalers, rust inhibitors, emulsion breakers, and the like.

The present invention employs as one part of a two-part mixture a dispersant type surfactant. The following surfactants are suitable: Cationic (cetylpyridinium chloride), nonionic (polyethylene oxides), and anionic (sodium lauryl sulfate).

The preferred light hydrocarbon utilized in accordance with the present invention is an aromatic light debutanized reformate (45–50 degrees API, viscosity at 50° F.~0.6 cs). Other suitable light hydrocarbons are: xylene, toluene, etc., and mixtures thereof.

Flushing of the line at high velocities is preferred to remove some of the free, solid wax particles. Flushing can be conducted by conventional crude oil or the like, and is preferably followed by a sweep of the line by either a soft foam swab (preferred density of 2 lbs/ft$^3$) or gel or tight emulsion for further pickup of wax particles. A gel may comprise, for example, a heavy residual oil treated with montmorillonite clay and, optionally, fine solids such as coal; an emulsion may be formed by adding water to the cleaning solution and shearing. The surfactant will allow creation of a tight emulsion. The gel and tight emulsion are preferably oil based so that they can be pumped further along a pipeline system. Water base gels and emulsions can be used but require removal from the pipeline system.

Exposure time that the mixture of a surfactant and light hydrocarbon remains in contact with the waxy material ranges preferably between 1–12 hours, although longer exposure times might obviously be used in the case of more difficult to remove deposits.

The foregoing description of the invention is merely intended to be explanatory thereof, and various changes in the details of the described method may be made within the scope of the appended claims without departing from the spirit of the invention.

What is claimed is:

1. A process for removing solid wax-containing material from surfaces which comprises contacting said wax-containing material with a surfactant dispersant and a light hydrocarbon, flushing the surfaces with crude oil, and sweeping the surfaces with an emulsion of a sheared solution of the surfactant, the light hydrocarbon and water.

2. A process for removing solid wax-containing material from surfaces which comprises contacting said wax-containing material with a surfactant and a light hydrocarbon, flushing the surfaces with crude oil, and sweeping the surfaces with a gel comprising a heavy residual oil and montmorillonite clay.

3. The process of claims 1 or 2 wherein the light hydrocarbon is an aromatic light reformate.

4. The process of claims 1 or 2 wherein the surfactant is cationic.

5. The process of claims 1 or 2 wherein the surfaces are inside a pipeline, flow line, well tubing or container.

6. The proces of claim 2 wherein the gel includes fine coal solids.

* * * * *